(12) United States Patent
Kim (10) Patent No.: US 11,992,979 B2
(45) Date of Patent: May 28, 2024

(54) VACUUM FORMING MACHINE HAVING PRE-BLOWING LOWER CHAMBER

(71) Applicant: GUNYANG ITT CO., LTD., Busan (KR)

(72) Inventor: Taek Hyun Kim, Busan (KR)

(73) Assignee: GUNYANG ITT CO., LTD. (KR)

( * ) Notice: Subject to any disclaimer, the term of this patent is extended or adjusted under 35 U.S.C. 154(b) by 202 days.

(21) Appl. No.: 17/468,870

(22) Filed: Sep. 8, 2021

(65) Prior Publication Data
US 2022/0297356 A1    Sep. 22, 2022

Related U.S. Application Data

(63) Continuation of application No. PCT/KR2021/005636, filed on May 6, 2021.

(30) Foreign Application Priority Data

Mar. 18, 2021    (KR) .................. 10-2021-0035430

(51) Int. Cl.
*B29C 43/56*    (2006.01)
*B29C 43/36*    (2006.01)
*B29C 43/52*    (2006.01)

(52) U.S. Cl.
CPC ............ *B29C 43/56* (2013.01); *B29C 43/361* (2013.01); *B29C 43/52* (2013.01); *B29C 2043/3615* (2013.01); *B29C 2043/561* (2013.01); *B29C 2791/006* (2013.01)

(58) Field of Classification Search
CPC ......... B29C 43/52; B29C 43/56; B29C 51/18; B29C 51/262; B29C 2043/561; B29C 51/06; B29C 2043/3615
See application file for complete search history.

(56) References Cited

U.S. PATENT DOCUMENTS

| 6,361,304 | B1 * | 3/2002 | Petersen | ............... | B29C 51/262 |
| | | | | | 425/384 |
| 2022/0063174 | A1 * | 3/2022 | Arahata | ............... | B29C 51/262 |

OTHER PUBLICATIONS

English Translation of JPH1120015A (Year: 1999).*
JPH03184828 (Year: 1991).*

* cited by examiner

*Primary Examiner* — Michael A Tolin
*Assistant Examiner* — Hana C Page
(74) *Attorney, Agent, or Firm* — Park & Associates IP Law Office (57) ABSTRACT

In a the vacuum forming machine having a pre-blowing lower chamber, a lower space located at the lower side of a raw material which is thermally expanded in a heating process for vacuum forming is sealed and the preset amount of air is introduced into the lower space of the raw material by a blowing device installed to communicate with the sealed lower space of the raw material such that the sagging of the raw material is prevented, whereby the vacuum forming of the raw material whose entire portion is uniformly heated is performed, thereby securing even thickness of the raw material.

3 Claims, 12 Drawing Sheets

VACUUM FORMING MACHINE HAVING PRE-BLOWING LOWER CHAMBER

REFERENCE TO RELATED APPLICATIONS

This is a continuation of International Patent Application PCT/KR2021/005636 filed on May 6, 2021, which designates the United States and claims priority of Korean Patent Application No. 10-2021-0035430 filed on Mar. 18, 2021, the entire contents of which are incorporated herein by reference.

FIELD OF THE INVENTION

The present disclosure relates generally to a vacuum forming machine having a pre-blowing lower chamber. More particularly, the present disclosure relates to a vacuum forming machine having a pre-blowing lower chamber which provides a structure in which a lower space located at the lower side of a raw material which is thermally expanded in a heating process for vacuum forming is sealed and a preset amount of air is introduced into the lower space of the raw material by a blowing device installed to communicate with the sealed lower space of the raw material such that the sagging of the raw material is prevented, whereby the vacuum forming of the raw material whose entire portion is uniformly heated is performed, thereby securing even thickness of the raw material and improving product quality, and a lower heater is disposed at a position close to the raw material, thereby increasing heating efficiency and facilitating the control of heating temperature for each portion of the raw material, and a structure in which the heated raw material is not exposed to outside air such that the raw material is prevented from cooling rapidly before being formed, thereby realizing the improvement of product quality, energy consumption reduction, productivity improvement, and further, a structure in which the amount of air blown in and out of the lower chamber by the blowing device is optimally controlled to fit the shape of a mold, thereby improving product quality and providing effective application of the vacuum forming machine to the manufacturing of a vehicle exterior material in which much sagging occurs.

BACKGROUND OF THE INVENTION

A vacuum forming machine is a device that performs the heating process and the vacuum forming process of a raw material moved by a feeding device or a transfer device. The raw material is made of a synthetic resin sheet, etc., is heated and softened, is put into a mold in a state where plastic deformation is possible, and then is molded into a preset shape by a mold to which vacuum pressure is applied.

Such a vacuum forming machine is mainly used for forming a vehicle interior material such as a door trim and an instrument panel, and is used to additionally attach a skin material to the surface of the interior material for the beauty or texture of the interior material according to a vehicle model.

Technologies related to the vacuum forming machine include "LOW-PRESSURE VACUUM FORMING MACHINE INCLUDING VACUUM SEALING MEANS" disclosed in Korean Patent No. 10-1062994, "SHEET TRANSFER APPARATUS OF AUTOMATIC VACUUM FORMING SYSTEM" disclosed in Korean Patent No. 10-0465741, and "VACUUM FORMING APPARATUS FOR VEHICLE INTERIAL MATERIAL" disclosed in Korean Utility Model Registration No. 20-0466282.

Figure 1:
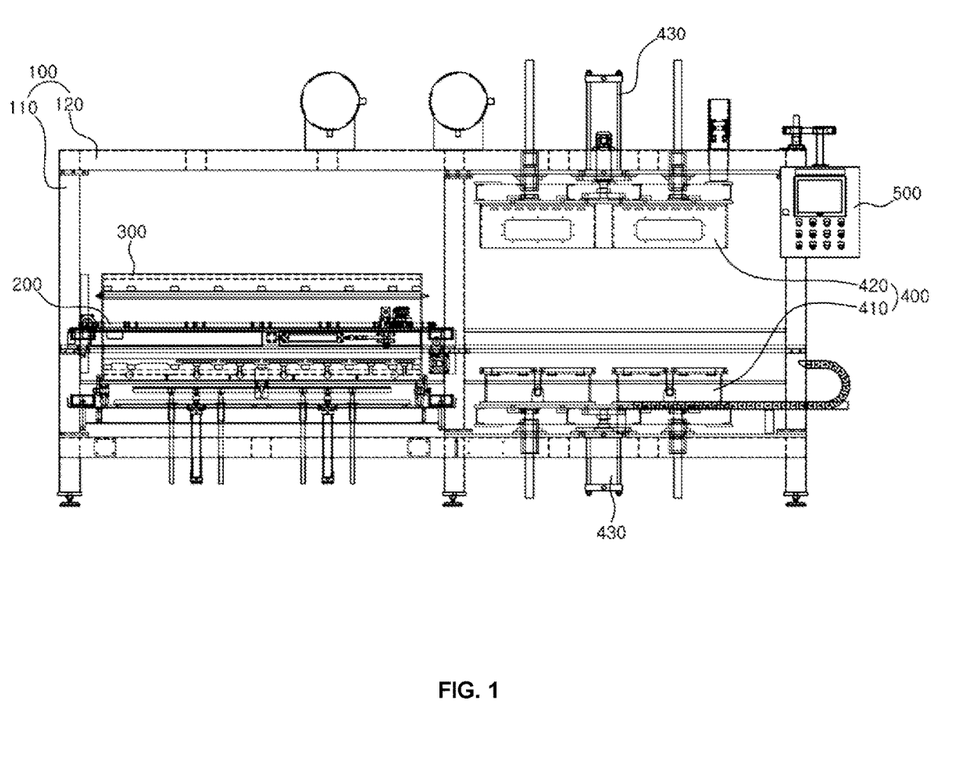
FIG. 1 is a view illustrating the configuration of a vacuum forming apparatus for a vehicle internal material disclosed in Korean Utility Model Registration No. 20-0466282.

FIG. 1 illustrates "VACUUM FORMING APPARATUS FOR VEHICLE INTERIAL MATERIAL" disclosed in Korean Utility Model Registration No. 20-0466282. The vacuum forming apparatus includes a frame part 100 composed of multiple vertical members 110 and multiple horizontal members 120, the frame part being configured to support the apparatus on the ground; a clamping part 200 installed at the frame part 100 and configured to clamp a raw material; a heater part 300 for preheating the raw material clamped by the clamping part 200; and a vacuum forming part 400 for vacuum forming the raw material by attaching the raw material to an internal part.

Figure 2A:
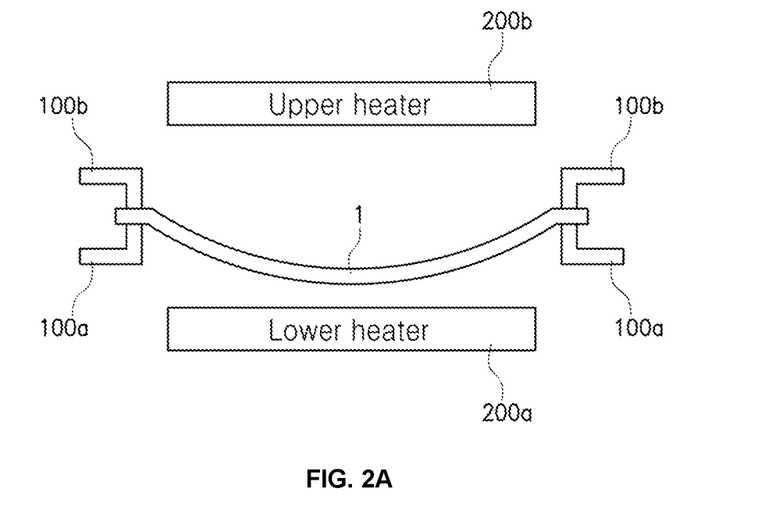
FIG. 2A is a view illustrating the sagging structure of a raw material of the conventional vacuum forming machine.

In a case of such a conventional vacuum forming machine, as illustrated in FIG. 2A, while the raw material is heated by a heater disposed at each of the upper and lower sides of the raw material, the raw material is thermally expanded and sags downward. Accordingly, as the raw material sags, a distance between the heater and the raw material for each portion of the raw material is changed. Accordingly, the degree of non-uniform heating of the raw material increases, which is a factor that causes quality deterioration and poor molding. To prevent this, in a case in which the heater is spaced apart from the raw material by a predetermined distance or more, heating efficiency decreases and energy consumption increases.

Meanwhile, recently, a vehicle exterior material such as a windbreak of a truck roof is also manufactured by vacuum forming. As a raw material for a vehicle exterior uses a base material made of an ABS material, the amount of sagging of the raw material in the heating process increases. Accordingly, it is a situation in which a technology for preventing the sagging of the raw material is required. (Raw materials for a vehicle exterior are different in amounts of sagging depending on sizes and physical properties thereof, but usually show the sagging of around 600 mm)

In addition, in order to minimize the sagging of a raw material, the technique of clamping the raw material in accordance with the size of the raw material is required.

SUMMARY OF THE INVENTION

Accordingly, in order to solve above problems occurring in the related art, the present disclosure is intended to propose a new type of a vacuum forming machine having a pre-blowing lower chamber in which a lower chamber, in which a lower heater and a lower mold located under a raw material are movably disposed, and a chamber for a standby lower heater are configured as airtight structures in which air does not leak to the outside, and a preset amount of air is introduced into the lower space of the raw material by a blowing device communicating with the lower chamber such that the sagging of the raw material is prevented, whereby a vacuum forming of the raw material whose entire portion is uniformly heated is performed such that even thickness of the raw material is secured and quality thereof is improved, and the lower heater is disposed at a position close to the raw material such that heating efficiency is increased and the control of heating temperature for each portion of the raw material is facilitated.

In addition, the present disclosure is intended to propose a new type of a vacuum forming machine having a pre-blowing lower chamber in which the lower chamber and a chamber for a standby lower heater have airtight structures in which air does not leak to the outside, and the lower mold and the lower heater located inside the lower chamber and the chamber for a standby lower heater, respectively, in which sealed states are maintained, perform the vacuum forming process and the heating process, respectively, while moving, whereby a heated raw material is not exposed to outside air and the raw material is prevented from cooling rapidly before being formed such that the improvement of product quality, energy consumption reduction, and productivity improvement can be realized.

Furthermore, the present disclosure is intended to propose a new type of a vacuum forming machine having a pre-blowing lower chamber which provides a structure in which to prevent the sagging of a raw material, the amount of air blown in and out of the lower chamber is optimally controlled by a blowing device according to the shape of a mold such that the vacuum forming machine improves product quality and is effectively applied to the manufacture of a vehicle exterior material in which much sagging occurs.

Additionally, the present disclosure is intended to propose a vacuum forming machine having a pre-blowing lower chamber in which the width of a clamp is variable according to the size of a raw material such that the clamp can be generally used in raw materials having various sizes.

In order to achieve the above objectives, according to one aspect of the present disclosure, there is provided a vacuum forming machine having a pre-blowing lower chamber and configured to vacuum form a raw material, the vacuum forming machine including: a sealing lower clamp of a raw material configured to clamp and fasten a lower surface of an edge portion of the raw material; an upper clamp of a raw material configured to clamp and fasten an upper surface of the edge portion of the raw material; a lower heater disposed at a lower side of the raw material located at a heating-forming zone and configured to operate in a heating process; an upper heater disposed at an upper side of the raw material located at the heating-forming zone and configured to operate in the heating process; a lower mold disposed at the lower side of the raw material located at the heating-forming zone and configured to operate in a vacuum forming process; a lower chamber having a lower space of the raw material in which the lower heater and the lower mold are disposed, and provided with a bottom surface and a side wall surrounding the lower space communicating with an upper surface of the lower chamber constituting the heating-forming zone, wherein the upper surface is closed by the raw material and the sealing lower clamp introduced through the upper surface and the lower space is sealed such that air is prevented from leaking to the outside; a blowing device installed to communicate with the lower space of the lower chamber and configured to introduce a preset amount of air into the lower space such that the raw material is prevented from being thermally expanded and sagging in the heating process; and a controller configured to control an operation of each of the lower heater, the upper heater, the lower mold, and the blowing device.

Here, the sealing lower clamp may be composed of first, second, third, and fourth side plates to fit side surfaces of the raw material, respectively, and each of the first, second, third, and fourth side plates is moved in X and Y-axis directions by a drive means of each of the first, second, third, and fourth side plates and is variable to fit a size of the raw material, wherein a contact surface between each of the first, second, third, and fourth side plates may be sealed.

According to the above solution, the following effects can be expected.

According to the vacuum forming machine having a pre-blowing lower chamber of the present disclosure, the vacuum forming of the raw material whose entire portion is uniformly heated is performed, thereby securing even thickness of the raw material and improving quality of the formed product. Furthermore, the sagging of the raw material is prevented and the lower heater is disposed at a position close to the raw material, thereby increasing heating efficiency, facilitating the control of heating temperature for each portion of the raw material, and reducing energy consumption.

In addition, according to the vacuum forming machine having a pre-blowing lower chamber of the present disclosure, a heated raw material is not exposed to outside air and the raw material is prevented from cooling rapidly before being formed, thereby realizing the improvement of product quality, energy consumption reduction, and productivity improvement. Furthermore, according to the vacuum forming machine having a pre-blowing lower chamber of the present disclosure, to prevent the sagging of the raw material, the amount of air blown in and out of the lower chamber by the blowing device is optimally controlled to fit the shape of a mold, thereby improving product quality.

Accordingly, the vacuum forming machine having a pre-blowing lower chamber of the present disclosure can be effectively applied to the manufacturing of a vehicle exterior material in which much sagging occurs.

Furthermore, even if the size of the raw material is changed, the sealing lower clamp of a raw material can clamp the raw material by changing a width thereof, thereby being used irrespective of the size of the raw material.

DETAILED DESCRIPTION OF THE INVENTION

Hereinafter, embodiments of the present disclosure will be described in detail with reference to the accompanying drawings FIGS. 2A and 2B to 8. Meanwhile, in the drawings and detailed description, the illustration and description of the configurations and operations of a vacuum forming machine, a clamp, a heater, a mold, a pre-blowing technology, a sag detection sensor which are generally used and which can be easily understood by those skilled in the art are simplified or omitted. Particularly, the detailed descriptions and illustrations of the specific technical configurations and operations of components that are not directly related to the technical features of the present disclosure are omitted, and only the technical configurations related to the present disclosure are briefly illustrated or described.

Figure 2B:
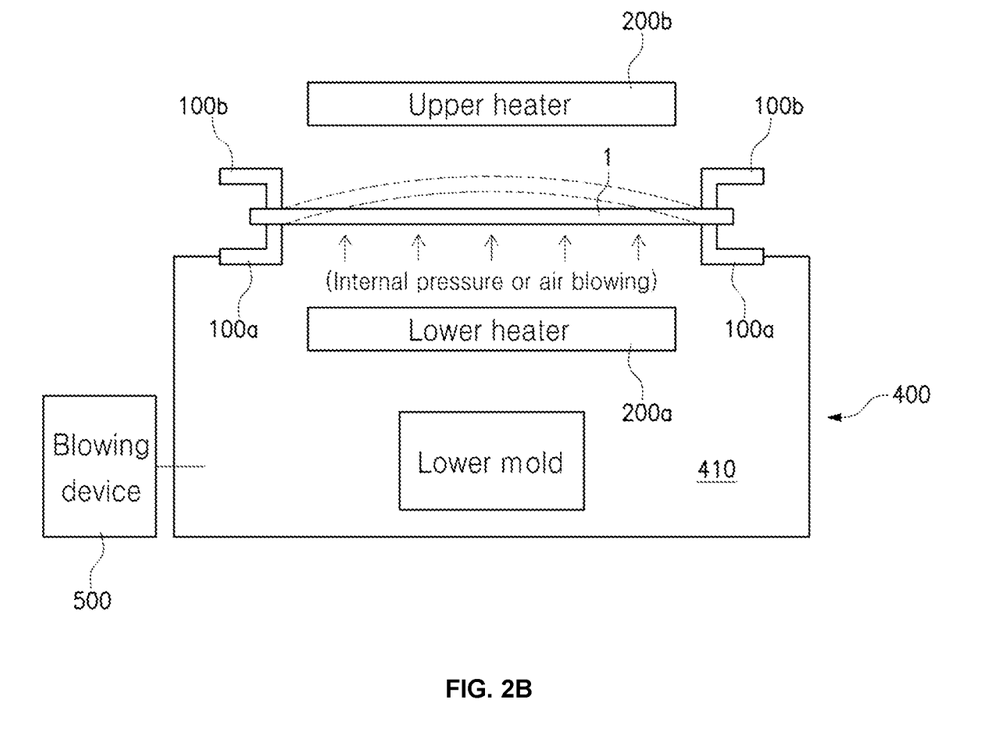
FIG. 2B is a view for illustrating the technological spirit of the vacuum forming machine having a pre-blowing lower chamber according to the present disclosure.
Figure 3:
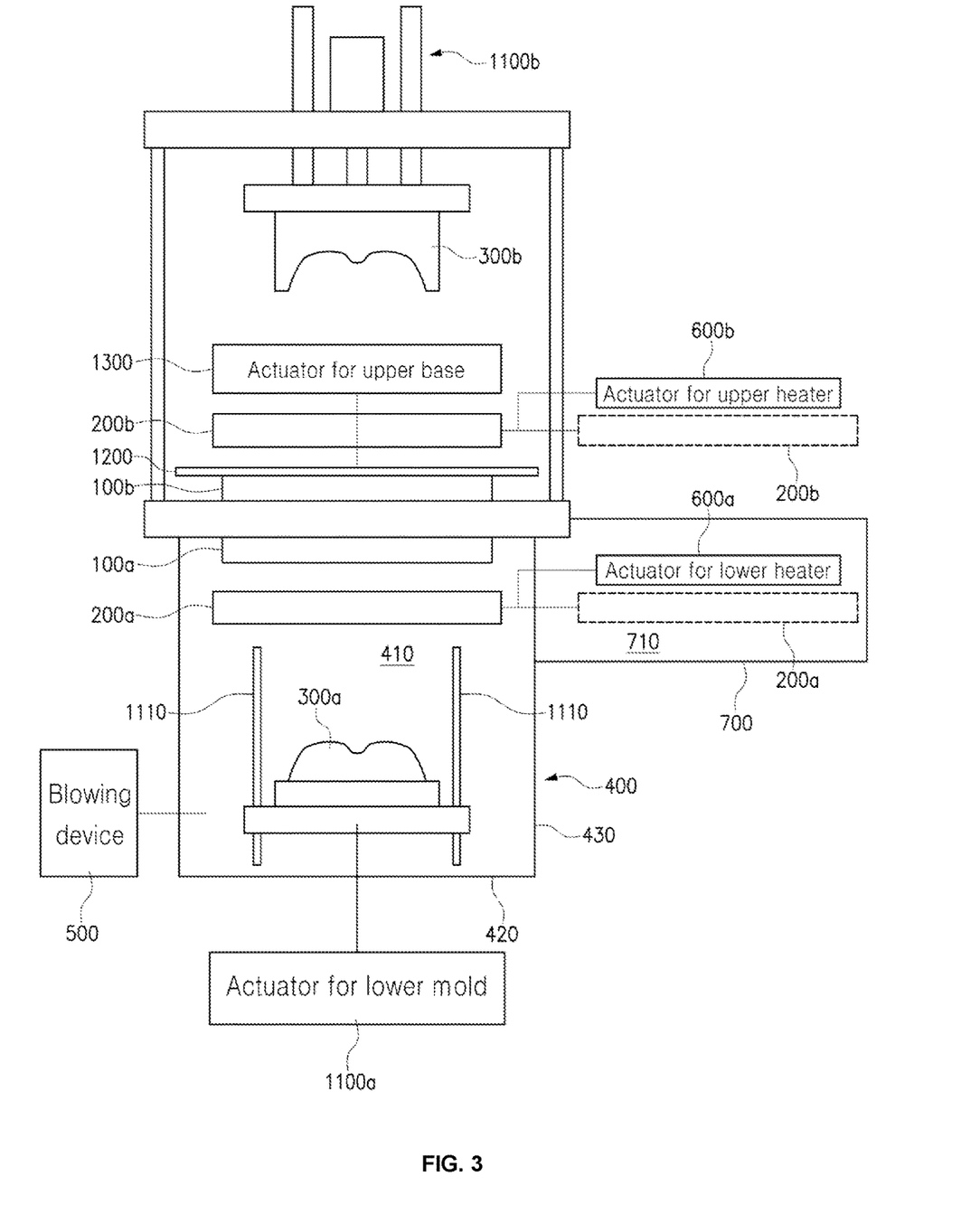
FIG. 3 is a thematic view illustrating the configuration of a vacuum forming machine having a pre-blowing lower chamber according to the present disclosure.
Figure 4:
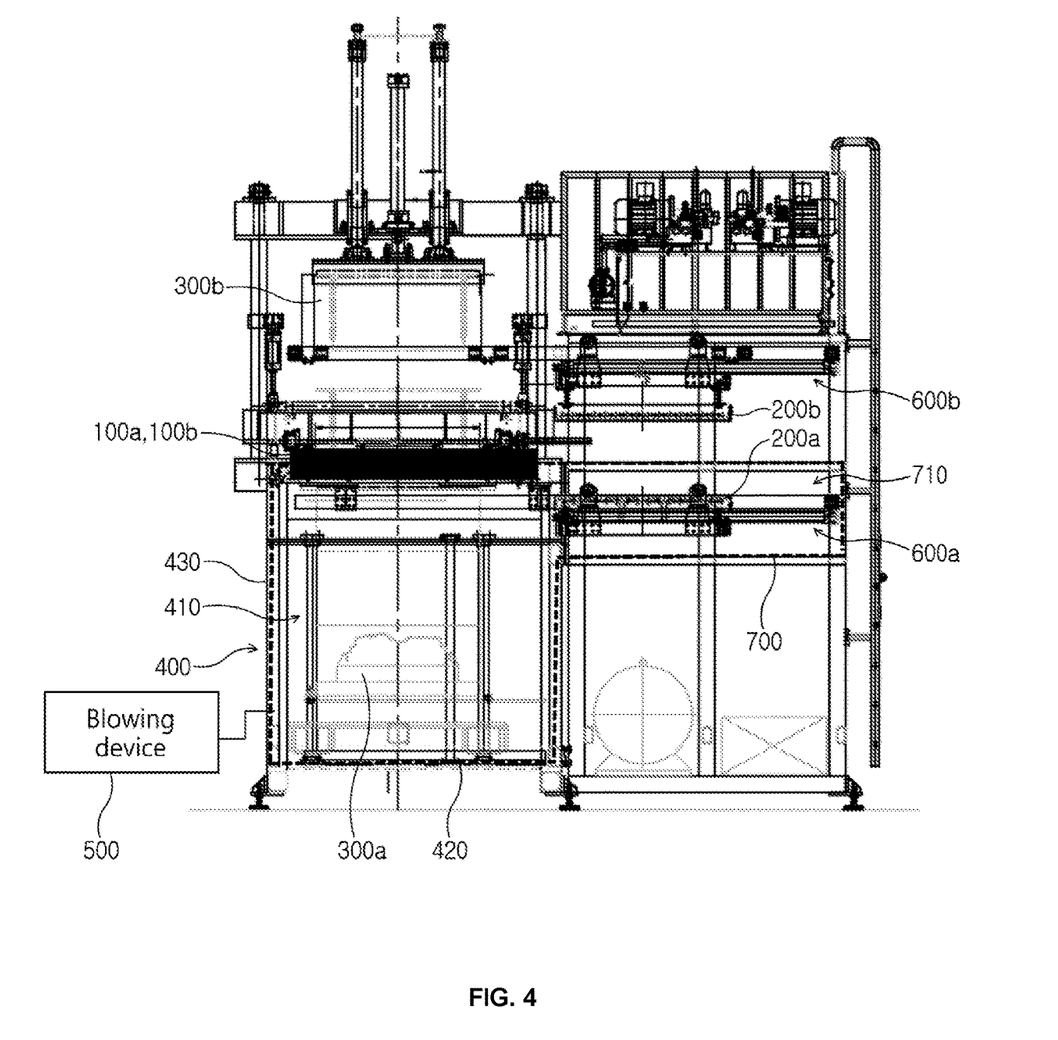
FIG. 4 is a view illustrating the configuration of the vacuum forming machine having a pre-blowing lower chamber according to an embodiment of the present disclosure.

As illustrated in FIG. 2B, in the vacuum forming machine having a pre-blowing lower chamber according to the present disclosure, a lower chamber 400 in which a lower heater 200a and a lower mold 300a located under the raw material 1 are disposed is configured as an airtight structure in which air does not leak to the outside, and a preset amount of air is introduced into the lower space 410 of the raw material by a blowing device 500 communicating with the lower chamber 400 such that the sagging of the raw material 1 is prevented. To this end, as illustrated in FIGS. 3 and 4, the vacuum forming machine having a pre-blowing lower chamber according to the embodiment of the present disclosure includes: a sealing lower clamp 100a of a raw material, an upper clamp 100b of a raw material, the lower heater 200a, an upper heater 200b, the lower mold 300a, an upper mold 300b, the lower chamber 400, the blowing device 500, an actuator 600a for the lower heater, an actuator 600b for the upper heater, the chamber 700 for a standby lower heater, and a controller 800.

Figure 5A:
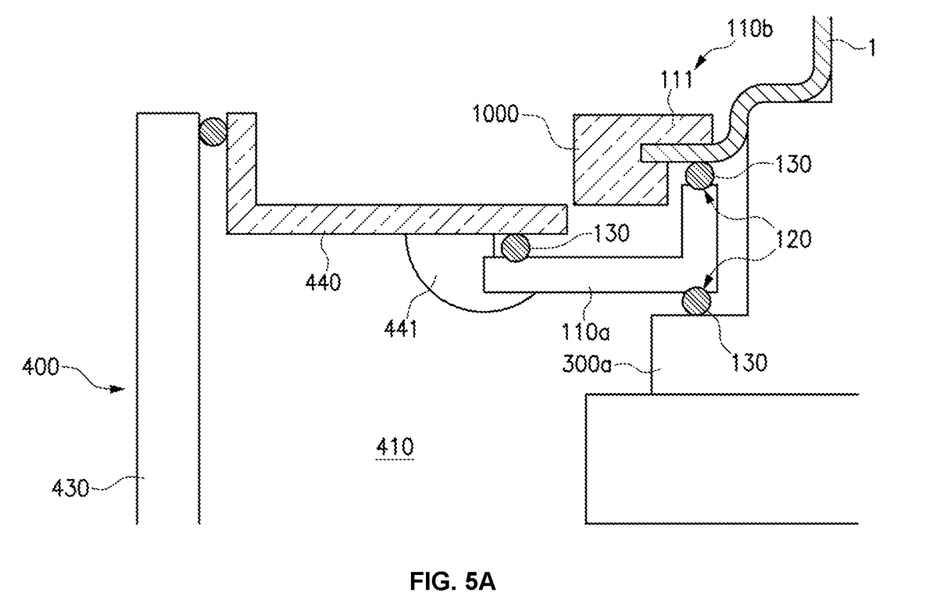
FIGS. 5A and 5B are sectional views illustrating the shapes and disposed structures of a sealing lower clamp of a raw material and an upper clamp of a raw material according to the embodiment of the present disclosure.
Figure 5B:
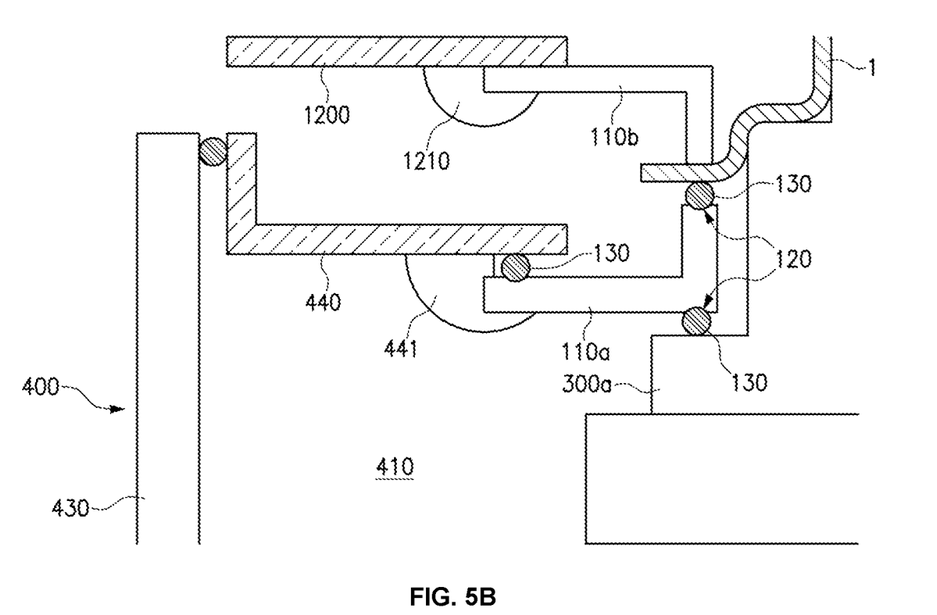

The sealing lower clamp 100a of a raw material clamps and fastens the lower surface of the edge portion of the raw material 1, and as illustrated in FIGS. 5A and 5B, may be connected to a fastening frame 440 which is connected to a side wall 430 of the lower chamber 400 by a sealant 130 for airtight packing. The sealing lower clamp 100a of a raw material is fastened by a fastener 441 located at the lower surface of the fastening frame 440, and the sealant 130 for airtight packing may be installed between the fastening frame 440 and the sealing lower clamp 100a.

The upper clamp 100b of a raw material clamps and fastens the upper surface of the edge portion of the raw material 1. Here, as illustrated in FIG. 3, the upper clamp 100b may be used by being fastened to the lower surface of an upper base 1200. The upper base 1200 is a plate moved up and down by an actuator 1300 for the upper base.

In addition, as illustrated in FIG. 5B, the upper clamp 100b of a raw material may be used by being fastened to a fastener 1210 formed at the lower surface of the upper base 1200.

Here, as illustrated in FIGS. 5A and 5B, the sealing lower clamp 100a of a raw material may be configured as a structure in which a lower clamp frame 110a having a "]" shaped vertical section constitutes each side of a rectangular frame. Particularly, according to the embodiment of the present disclosure, the sealing lower clamp 100a of a raw material has a sealing groove 120 formed at a portion which the sealing lower clamp 100a is in contact with each of the raw material 1, the lower mold 300a, and the lower chamber 400. Accordingly, the sealed state of the lower space 410 can be maintained by the sealant 130 for airtight packing which is fitted and fastened to the sealing groove 120 of the sealing lower clamp 100a.

Figure 6:
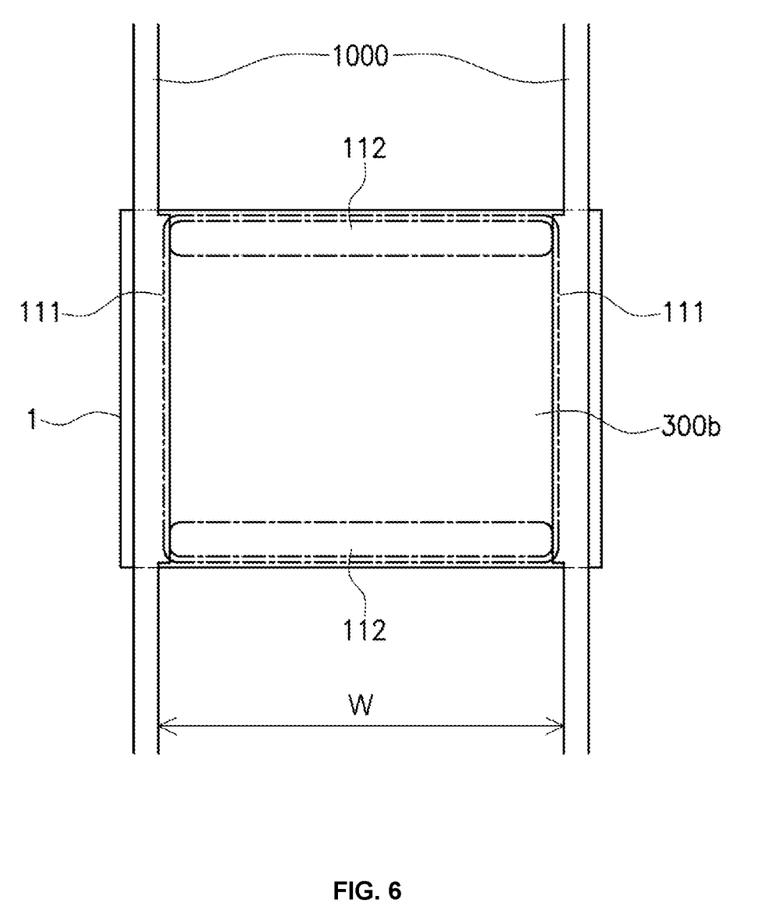
FIG. 6 is a view illustrating the entire configuration of the upper clamp of a raw material according to the embodiment of the present disclosure on the basis of the automatic supply of a raw material.

The vacuum forming machine having a pre-blowing lower chamber according to the embodiment of the present disclosure may have a configuration in which the raw material 1 is automatically loaded/unloaded through a raw material feeding rail 1000, and may have a configuration in which the raw material 1 is manually loaded/unloaded by an operator. When the vacuum forming machine has the configuration in which the raw material 1 is automatically loaded/unloaded, the upper clamp 100b of a raw material may be composed of an upper frame 111 of a rail side clamp and an upper frame 112 of a mold side clamp as illustrated in FIG. 6.

The upper frame 111 of a rail side clamp is formed at each of a pair of raw material feeding rails 1000 having adjustable widths w. As illustrated in FIG. 5A, the upper frame 111 may be configured to have an upper surface formed at each of the raw material feeding rails 1000 by horizontally protruding and extending therefrom in one direction by a preset length.

The upper frame 112 of a mold side clamp is configured to be orthogonal to the upper frame 111 of a rail side clamp by protruding downward at the upper mold 300b. Such an upper frame 112 of a mold side clamp is removably fastened to the edge portion of the lower mold 300a in the initial setting stage of the vacuum forming machine, and then may be fitted to the edge portion of the upper mold 300b due to the lowering of the upper mold 300b.

Figure 7:
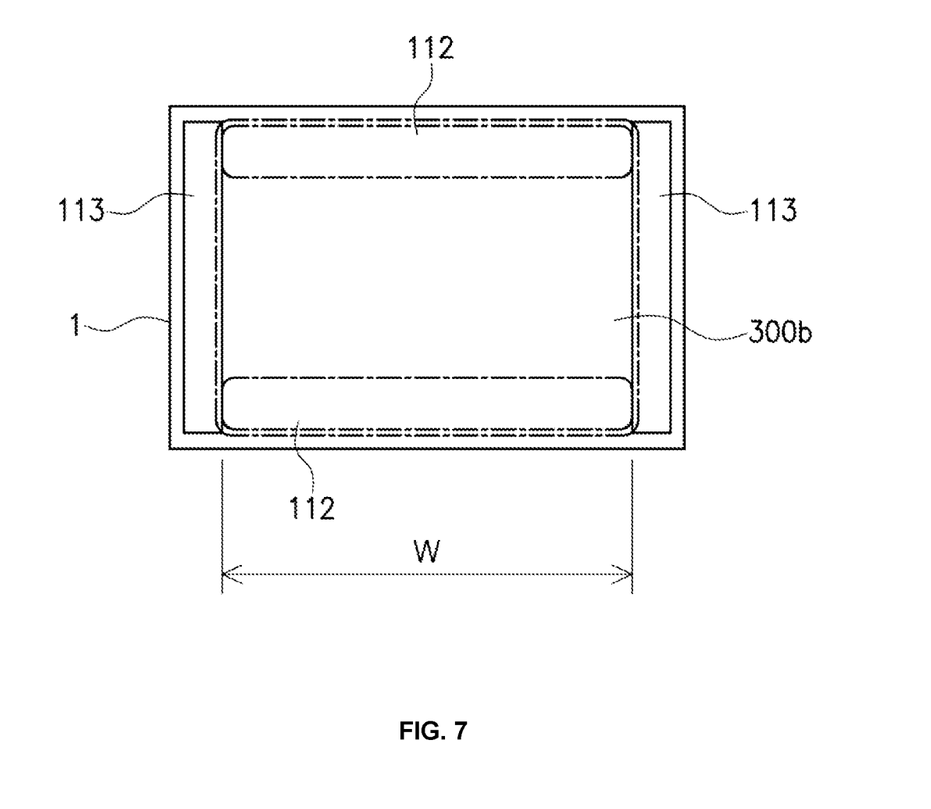
FIG. 7 is a view illustrating the entire configuration of the upper clamp of a raw material according to another embodiment of the present disclosure on the basis of the manual supply of a raw material.

Unlike the above configuration, when the vacuum forming machine has the configuration in which the raw material 1 is manually loaded/unloaded, the upper clamp 100b of a raw material may be composed of an upper frame 113 of an upper base side clamp and the upper frame 112 of a mold side clamp as illustrated in FIG. 7.

The upper frame 113 of an upper base side clamp is used for a general use by being fastened to the lower surface of the upper base 1200 moved up and down by the actuator 1300 for the upper base, and to this end, is configured to have an adjustable width w.

The upper frame 112 of a mold side clamp is configured to be orthogonal to the upper frame 113 of an upper base side clamp by protruding downward at the upper mold 300b. Such an upper frame 112 of a mold side clamp is removably fastened to the edge portion of the lower mold 300a in the initial setting stage of the vacuum forming machine, and then may be fitted to the edge portion of the upper mold 300b due to the lowering of the upper mold 300b.

Here, the upper frame 113 of an upper base side clamp and the upper frame 112 of a mold side clamp have a groove and a protrusion, respectively, which form a concave-convex relationship, at a portion at which the upper frame 113 and the upper frame 112 are connected to each other so that the upper frame 113 and the upper frame 112 can be engaged with each other, wherein each of the groove and protrusion may be configured in a V-shape.

Meanwhile, according to the embodiment of the present disclosure, as illustrated in FIG. 5B, the upper clamp 100*b* of a raw material is configured as a structure in which an upper clamp frame 110*b* having a "]" shaped vertical section constitutes each side of a rectangular frame.

The lower heater 200*a* is disposed at the lower side of the raw material 1 located at a heating-forming zone and is operated in the heating process, and the upper heater 200*b* is disposed at the upper side of the raw material 1 located at the heating-forming zone and is operated in the heating process.

Here, the lower heater 200*a* and the upper heater 200*b* are configured to control heating temperature for each portion of the raw material.

The lower mold 300*a* is disposed at the lower side of the raw material 1 located at the heating-forming zone, is operated in the vacuum forming process, and is disposed to move upward and downward in the lower space 410 of the lower chamber 400. The upper mold 300*b* is disposed at the upper side of the raw material 1 located at the heating-forming zone and is operated in the vacuum forming process.

Here, the vacuum forming machine having a pre-blowing lower chamber according to the embodiment of the present disclosure is provided with an actuator 1100*a* for the lower mold and an actuator 1100*b* for the upper mold, and induces the vertical movement of each of the lower mold 300*a* and the upper mold 300*b*.

The lower mold 300*a* is moved downward by the actuator 1100*a* for the lower mold, and in a state in which the lower mold 300*a* is moved downward, the heating process is performed by the lower heater 200*a* introduced into the lower space 410 of the lower chamber 400.

In addition, the lower mold 300*a* is moved upward by the actuator 1100*a* for the lower mold, and the vacuum forming process is performed by the lower mold 300*a* which is moved upward.

The lower chamber 400 has the lower space 410 of the raw material in which the lower heater 200*a* and the lower mold 300*a* are disposed, and is provided with a bottom surface 420 and the side wall 430 surrounding the lower space 410 of the raw material communicating with the upper surface of the lower chamber constituting the heating-forming zone. The raw material 1 and the sealing lower clamp 100*a* of a raw material are introduced to the upper surface of the lower chamber 400. The upper surface of the lower chamber 400 is closed by the raw material 1 and the sealing lower clamp 100*a* and the lower space 410 is sealed such that an air leakage to the outside is prevented. The vacuum forming machine having a pre-blowing lower chamber according to the embodiment of the present disclosure performs the heating process and the vacuum forming process for the raw material 1 introduced to the upper surface of the sealed lower space 410 of the raw material.

The blowing device 500 is installed to communicate with the lower space 410 of the lower chamber 400 and introduces the preset amount of air into the lower space 410, so in the heating process, the sagging of the raw material 1 due to thermal expansion is prevented.

Here, the blowing device 500 may have the configuration of a device embodied in an internal pressure control mode, may have the configuration of a device embodied in an air jet control mode, and may have the configuration of a composite device that selectively embodies the internal pressure control mode and the air jet control mode.

In the internal pressure control mode, the internal pressure of the lower space 410 is controlled in real time such that the raw material 1 is horizontally disposed in the heating process and is expanded upwards in the vacuum forming process. In the air jet control mode, air is jetted at a preset speed in a direction toward the lower surface of the raw material 1 located at the upper surface of the lower space 410 such that the raw material 1 is horizontally disposed in the heating process and is expanded upwards in the vacuum forming process.

The actuator 600*a* for the lower heater is connected to the lower heater 200*a* and induces the lateral horizontal movement of the lower heater 200*a*.

The actuator 600*b* for the upper heater is connected to the upper heater 200*b* and induces the lateral horizontal movement of the upper heater 200*b*.

The chamber 700 for a standby lower heater communicates with the lower space 410 of the lower chamber 400 and defines a heater arrangement space 710 disposed at the upper lateral outside of the lower space 410 such that the lower heater 200*a* removed from the lower space 410 after completing the heating process waits in the heater arrangement space 710. Such a heater arrangement space 710 is also defined as an airtight structure such that air is prevented from leaking to the outside. The lower space 410 of the lower chamber 400 and the heater arrangement space 710 of the chamber 700 for a standby lower heater communicate with each other to constitute a sealed structure as a whole.

Figure 8:
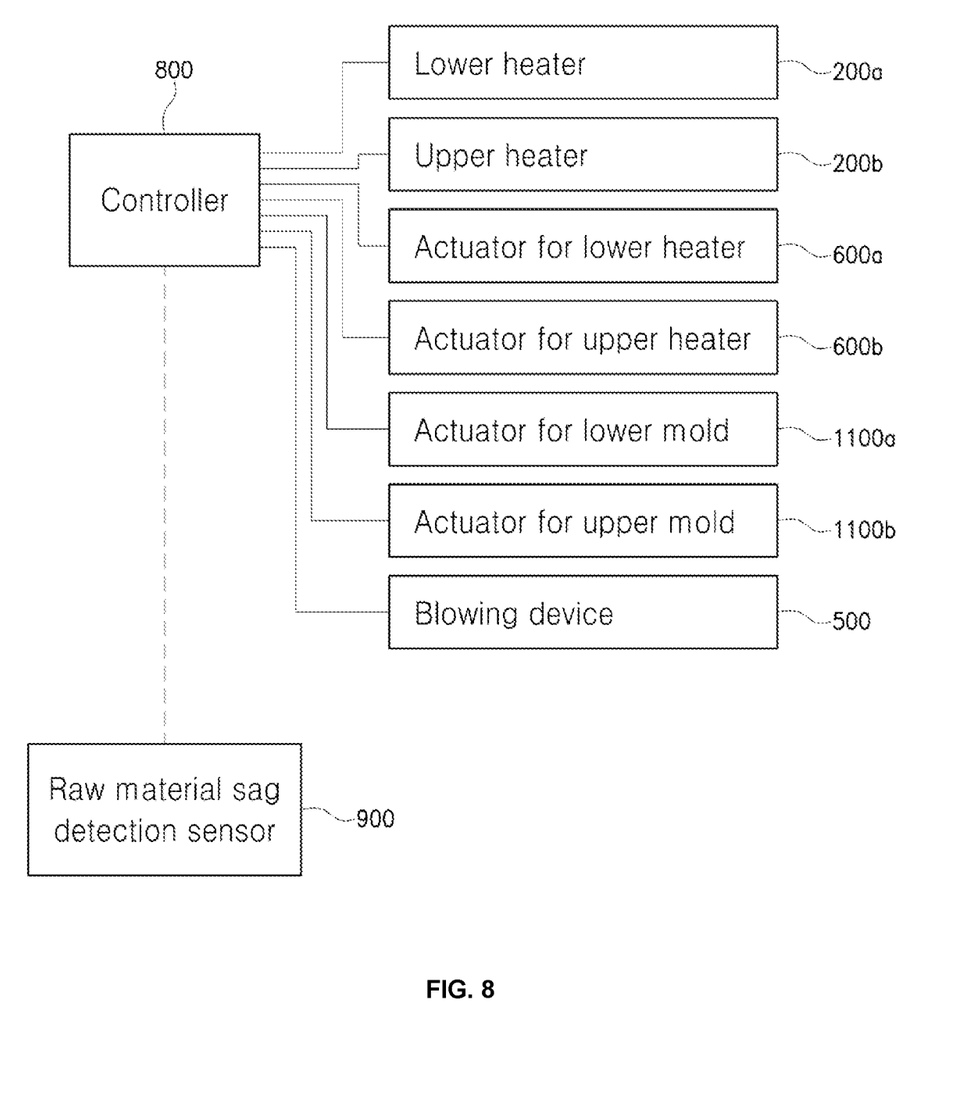
FIG. 8 is a block diagram illustrating the control configuration of the vacuum forming machine having a pre-blowing lower chamber according to the embodiment of the present disclosure.

As illustrated in FIG. 8, the controller 800 controls the operations of the lower heater 200*a*, the upper heater 200*b*, the actuator 600*a* for the lower heater, the actuator 600*b* for the upper heater, the actuator 1100*a* for the lower mold, the actuator 1100*b* for the upper mold, and the blowing device 500 such that the raw material 1 is vacuum formed without sagging after being heated.

Here, the controller 800 according to the embodiment of the present disclosure allows the amount of air blown in and out of the lower chamber 400 to be optimally controlled according to the shape of a mold. Additionally, the controller 800 according to the embodiment of the present disclosure performs the temperature control of each of the lower heater 200*a* and the upper heater 200*b* such that heating temperature is controlled for each portion of a raw material.

Here, according to the vacuum forming machine having a pre-blowing lower chamber according to the embodiment of the present disclosure, before the raw material 1 is heated and is thermally expanded, the blowing device 500 is operated such that the lower space 410 in contact with the lower surface of the raw material 1 has pressure of a predetermined level or more, and accordingly, the pressure of the predetermined level or more is applied to the lower surface of the raw material 1, so the sagging of the raw material 1 can be prevented.

In addition, the vacuum forming machine having a pre-blowing lower chamber according to the embodiment of the present disclosure may be provided with a raw material sag detection sensor 900. The raw material sag detection sensor 900 is a sensor that detects raw material sag information in real time in the heating process.

In response to this, the controller 800 receives the raw material sag information from the raw material sag detection sensor 900, controls the operation of the blowing device 500 in real time according to the raw material sag information, and induces a raw material 1 which is sagging to rapidly return to the horizontal arrangement, so the sagging of the raw material 1 may be prevented.

According to the embodiment of the present disclosure, in the vacuum forming machine having a pre-blowing lower chamber which is configured as described above, the lower chamber 400, in which the lower heater 200a and the lower mold 300a located under the raw material 1 are movably disposed, and the chamber 700 are configured as airtight structures in which air does not leak to the outside, and the preset amount of air is introduced into the lower space 410 by the blowing device 500 communicating with the lower chamber 400 such that the sagging of the raw material 1 is prevented. Accordingly, vacuum forming is performed on the raw material 1 whose entire portion is uniformly heated so as to secure even thickness of the raw material 1 and improve quality thereof, and the lower heater 200a may be disposed at a position close to the raw material so as to increase heating efficiency and facilitate the control of heating temperature for each portion of a raw material.

In addition, in the vacuum forming machine having a pre-blowing lower chamber according to the embodiment of the present disclosure, the lower chamber 400 and the chamber 700 have airtight structures in which air does not leak to the outside. The lower mold 300a and the lower heater 200a located inside the lower chamber 400 and the chamber 700, respectively, in which sealed states are maintained, perform the vacuum forming process and the heating process, respectively, while moving. Accordingly, a heated raw material 1 is not exposed to outside air, and the raw material is prevented from cooling rapidly before being formed, so the improvement of product quality, energy consumption reduction, and productivity improvement can be realized.

Furthermore, in the vacuum forming machine having a pre-blowing lower chamber according to the embodiment of the present disclosure, the sagging of the raw material is prevented and the amount of air blown in and out of the lower chamber 400 by the blowing device 500 is optimally controlled to fit the shape of a mold, thereby realizing the improvement of product quality and an effective application to the manufacturing of a vehicle exterior material in which much sagging occurs.

Figure 9:
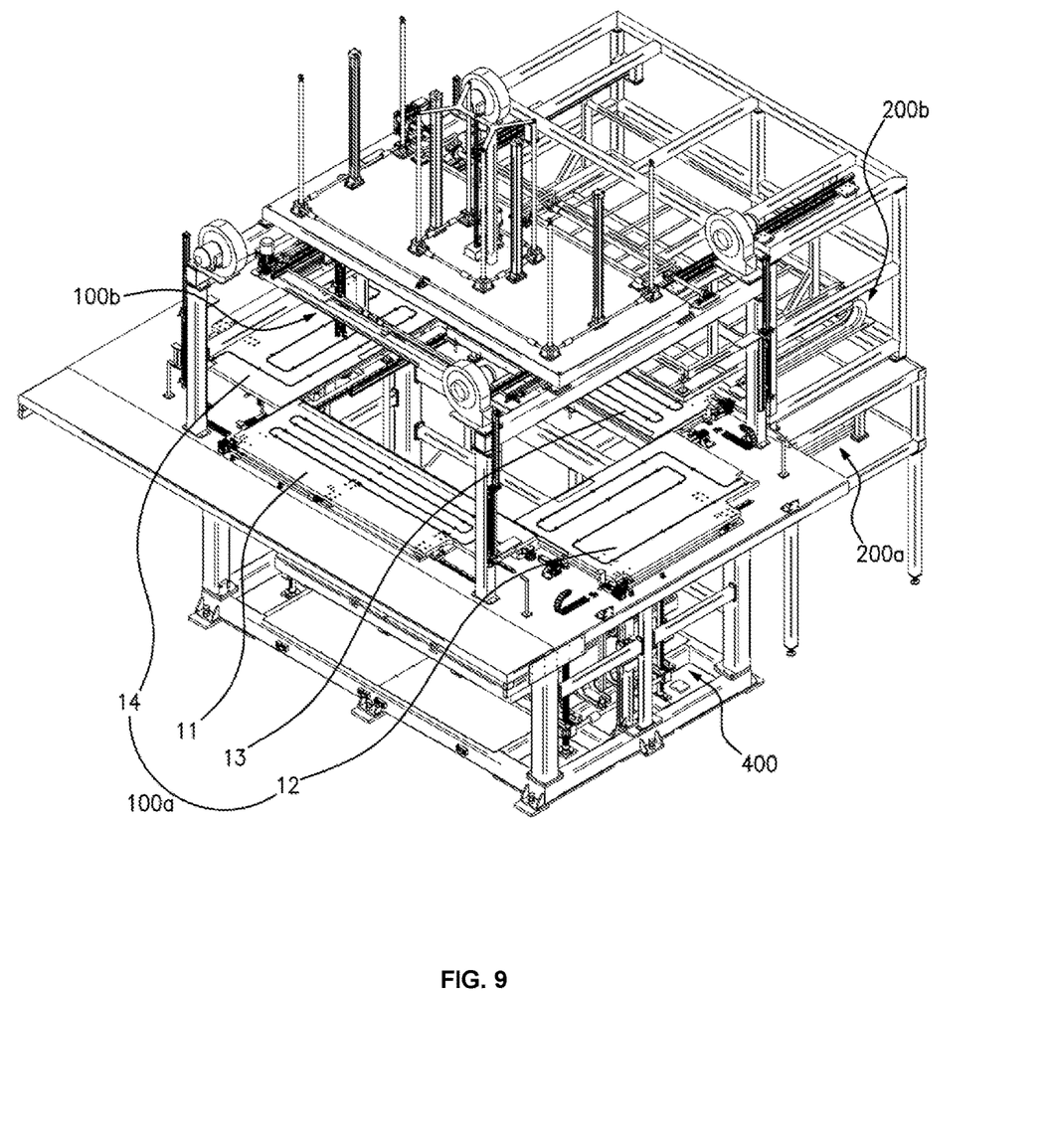
FIG. 9 is a view illustrating the vacuum forming machine having a pre-blowing lower chamber and provided with a 4-side sealing clamp having a variable width according to the another embodiment of the present disclosure.
Figure 10:
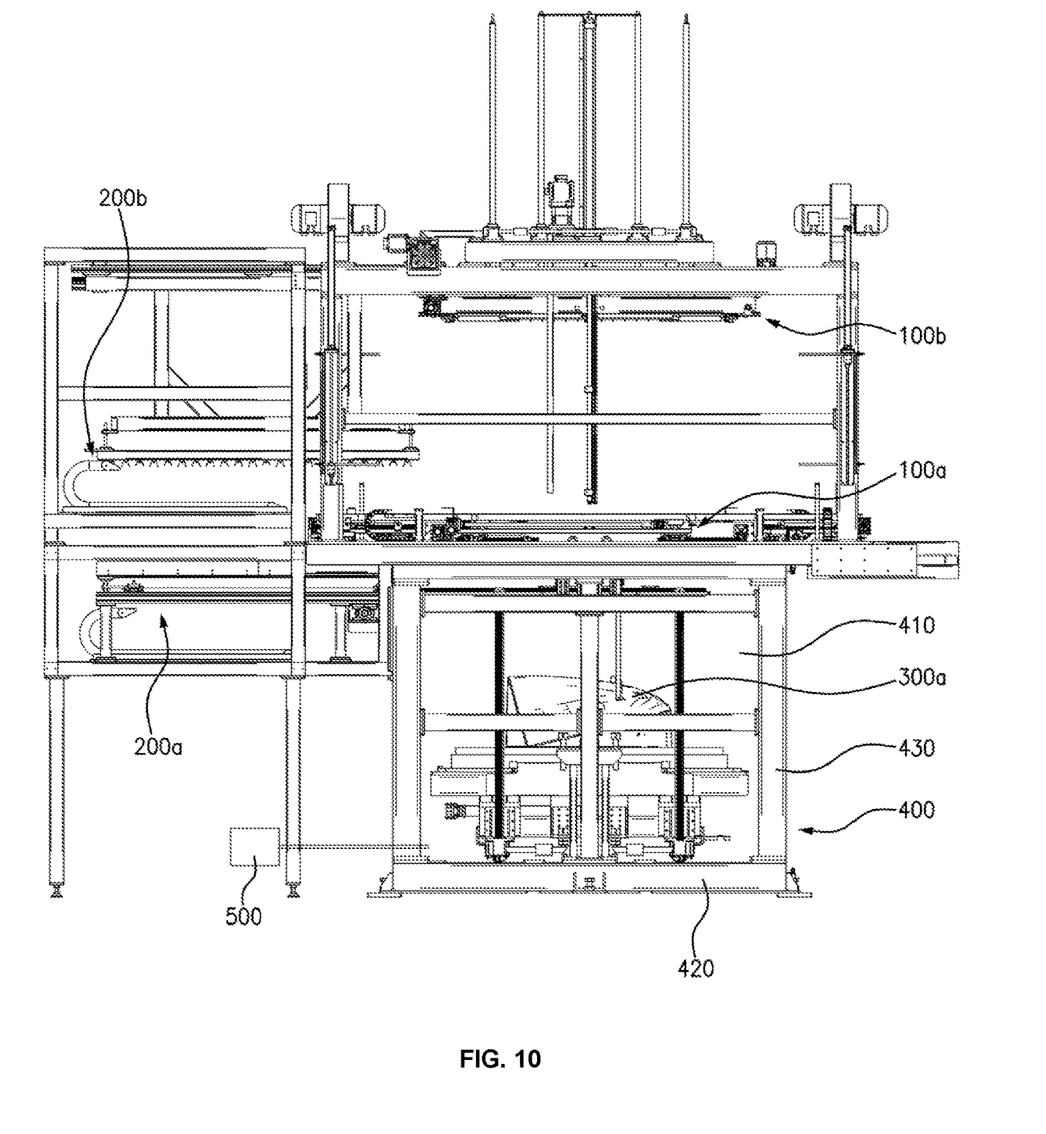
FIG. 10 is a view illustrating the inner configuration of the vacuum forming machine having a pre-blowing lower chamber and provided with the 4-side sealing clamp having a variable width according to the another embodiment of the present disclosure.
Figure 11:
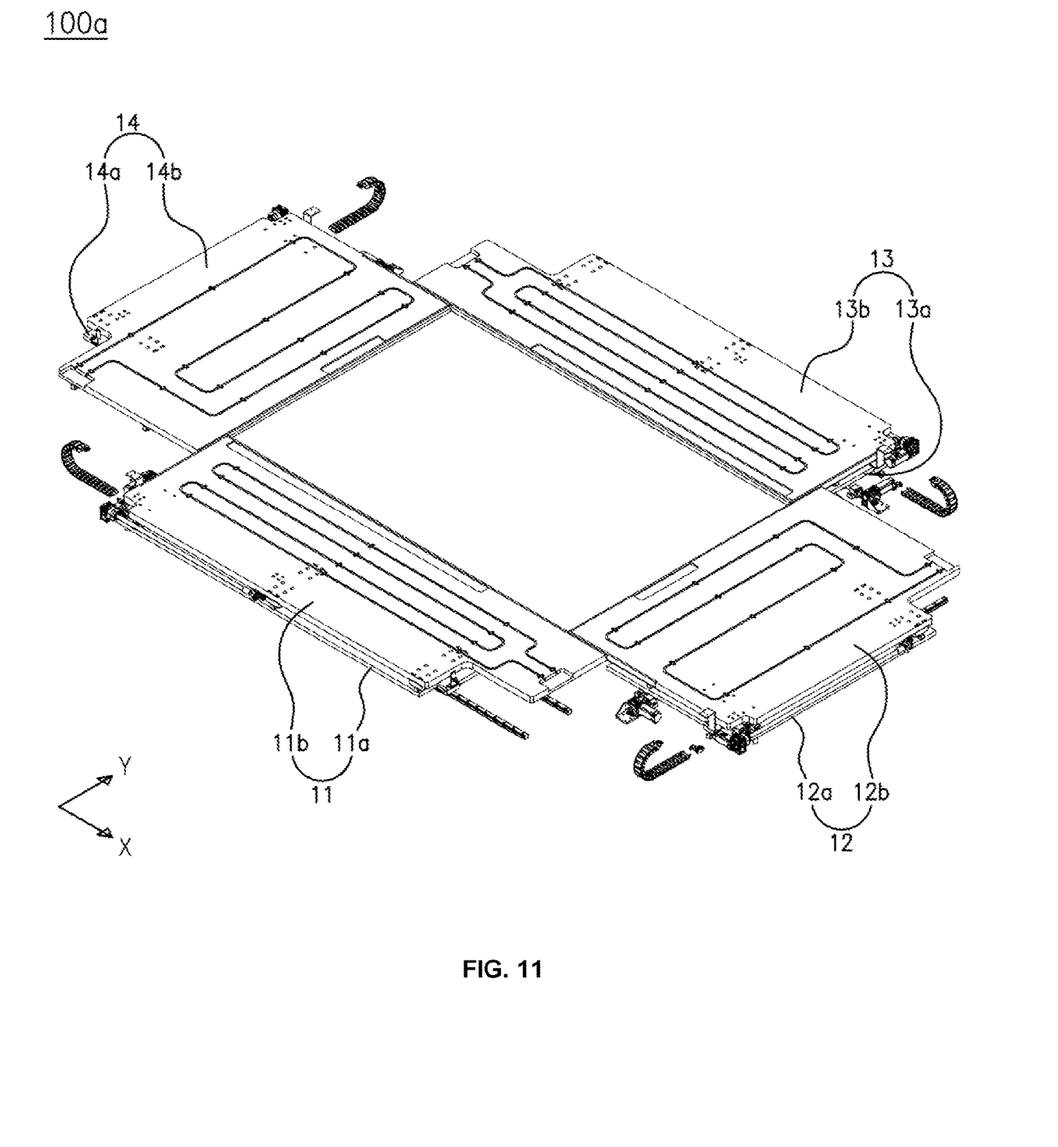
FIG. 11 is a view illustrating the enlarged operation state of the 4-side sealing clamp having a variable width of the vacuum forming machine having a pre-blowing lower chamber according to the another embodiment of the present disclosure.
Figure 12:
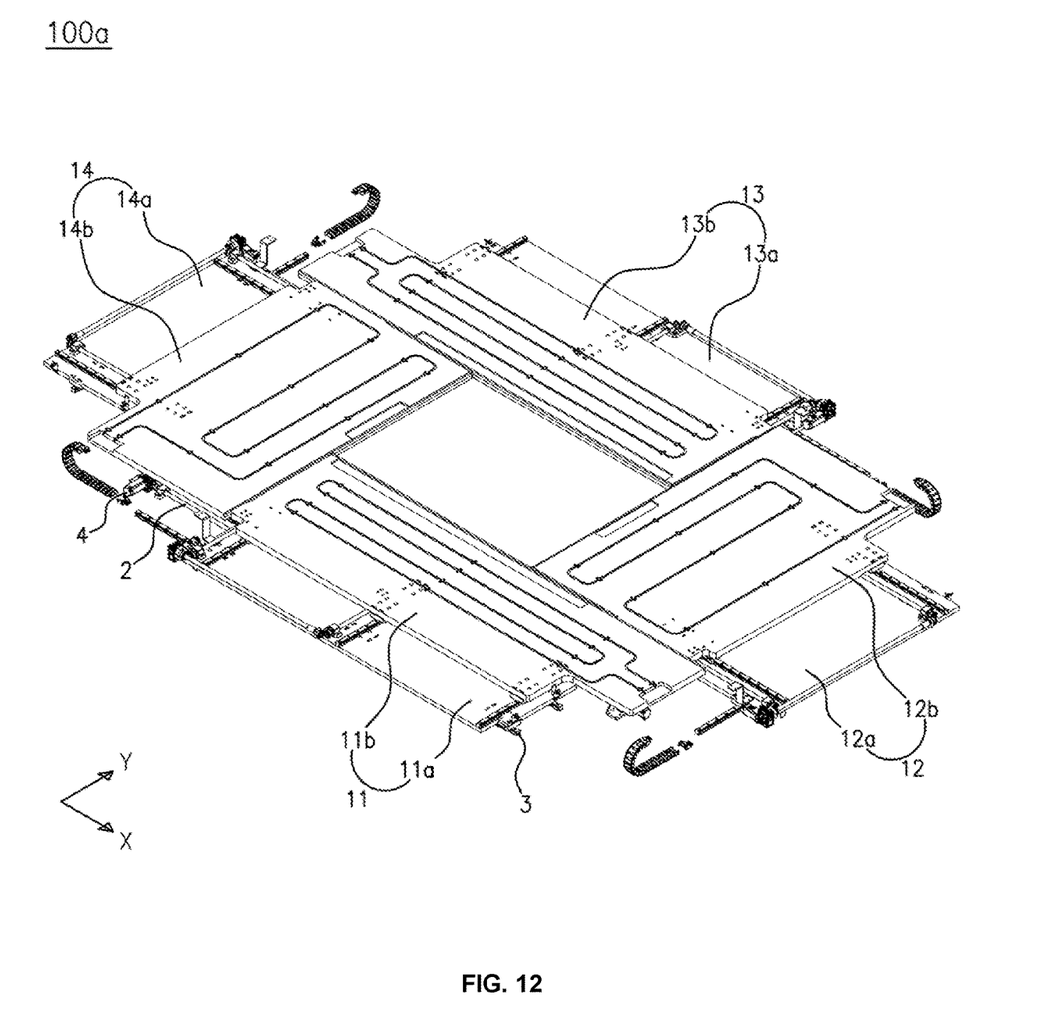
FIG. 12 is a view illustrating the reduced operation state of the 4-side sealing clamp having a variable width of the vacuum forming machine having a pre-blowing lower chamber according to the another embodiment of the present disclosure.

FIG. 9 is a view illustrating the vacuum forming machine having a pre-blowing lower chamber and provided with a 4-side sealing clamp having a variable width according to the another embodiment of the present disclosure; FIG. 10 is a view illustrating the inner configuration of the vacuum forming machine having a pre-blowing lower chamber and provided with the 4-side sealing clamp having a variable width according to the another embodiment of the present disclosure; FIG. 11 is a view illustrating the enlarged operation state of the 4-side sealing clamp having a variable width of the vacuum forming machine having a pre-blowing lower chamber according to the another embodiment of the present disclosure; and FIG. 12 is a view illustrating the reduced operation state of the 4-side sealing clamp having a variable width of the vacuum forming machine having a pre-blowing lower chamber according to the another embodiment of the present disclosure.

Referring to FIGS. 9 and 10, according to the present disclosure, the vacuum forming machine having a lower chamber and provided with the 4-side sealing clamp having a variable width includes the sealing lower clamp 100a of a raw material, the upper clamp 100b of a raw material, the lower heater 200a, the upper heater 200b, the lower mold 300a, the lower chamber 400, and the blowing device 500, and it is the main gist of the present disclosure that the sealing lower clamp 100a is configured to have a variable width and can be used by being enlarged or reduced to correspond to the size of the raw material.

Hereinafter, each configuration of the vacuum forming machine will be sequentially described.

First, the sealing lower clamp 100a of a raw material clamps and fastens only the lower surface of the edge portion of the raw material and seals the raw material.

The upper clamp 100b of a raw material clamps and fastens the upper surface of the edge portion of the raw material.

The lower heater 200a is disposed at the lower side of the raw material located at the heating-forming zone and is operated in the heating process.

The upper heater 200b is disposed at the upper side of the raw material located at the heating-forming zone and is operated in the heating process.

The lower mold 300a is disposed at the lower side of the raw material located at the heating-forming zone and is operated in the vacuum forming process.

The lower chamber 400 has the lower space 410 of the raw material in which the lower heater 200a and the lower mold 300a are disposed, and is provided with the bottom surface 420 and the side wall 430 surrounding the lower space 410 of the raw material communicating with the upper surface of the lower chamber constituting the heating-forming zone, wherein the upper surface is closed by the raw material and the sealing lower clamp 100a introduced through the upper surface and the lower space 410 of the raw material is sealed such that air is prevented from leaking to the outside.

The blowing device 500 is installed to communicate with the lower space 410 of the lower chamber 400, and configured to introduce the preset amount of air into the lower space 410 such that the raw material is prevented from being thermally expanded and sagging in the heating process.

The sealing lower clamp 100a of a raw material is composed of first, second, third, and fourth side plates 11, 12, 13, and 14 to fit the side surfaces of the raw material, respectively. Each of the first, second, third, and fourth side plates 11, 12, 13, and 14 is moved in X and Y-axis directions by a drive means of each of the first, second, third, and fourth side plates 11, 12, 13, and 14 and is variable to fit the size of the raw material.

Referring to FIGS. 11 and 12, the first, second, third, and fourth side plates 11, 12, 13, and 14 are disposed along 4-side edges of the raw material, respectively, and each of the first, second, third, and fourth side plates 11, 12, 13, and 14 is sealed therebetween to correspond to the size of the raw material. Here, the first, second, third, and fourth side plates 11, 12, 13, and 14 include: lower plates 11a, 12a, 13a, and 14a, respectively, which can reciprocate, and upper plates 11b, 12b, 13b, and 14b located at upper portions of the lower plates 11a, 12a, 13a, and 14a, respectively, and configured to operate in cooperation with the lower plates 11a, 12a, 13a, and 14a, respectively, wherein the upper plates 11b, 12b, 13b, and 14b can reciprocate in directions orthogonal to the lower plates 11a, 12a, 13a, and 14a, respectively, and adjacent surfaces thereof are in close contact with each other.

First, the first side plate 11 is movable in X and Y-axis directions. Specifically, the first side plate 11 is composed of the lower plate 11a which is located at the lower side of the first side plate 11 and can move in the X-axis direction, and the upper plate 11b which is located at the upper side of the lower plate 11a and can move in the Y-axis direction orthogonal to the X-axis direction, and accordingly, the first side plate 11 can perform a 2-axis movement.

The lower plate 11a is installed at a side of the lower chamber (not shown) and can move in the X-axis direction along an LM guide 3 while a ball screw 2 is operated by a servomotor 4, and the upper plate 11b is installed at the upper surface of the lower plate 11a and can move in the Y-axis direction along the LM guide while the ball screw is operated by the servomotor. In the same principle, the remaining lower plates 12a, 13a, and 14a and the remaining upper plates 12b, 13b, and 14b can also be moved by the servomotor, the ball screw, and the LM guide and thus s detailed description thereof will be omitted.

Next, the second side plate 12 is installed at a position orthogonal to the first side plate 11. Here, the second side plate 12 is composed of a lower plate 12a which can move in the Y-axis direction, and an upper plate 12b which is located at the upper portion of the lower plate 12a and can move in the X-axis direction orthogonal to the Y-axis direction, wherein the upper plate 12b of the second side plate 12 is close contact with the upper plate 11b of the first side plate 11.

In addition, the third side plate 13 is installed at a position orthogonal to the second side plate 12 and is located at a position parallel to the first side plate 11. Here, the third side plate 13 is composed of a lower plate 13a which can move in the X-axis direction, and the upper plate 13b which is installed at the upper portion of the lower plate 13a and can move in the Y-axis direction orthogonal to the X-axis direction, wherein the upper plate 13b of the third side plate 13 is in close contact with the upper plate 12b of the second side plate 12.

Finally, the fourth side plate 14 is installed at a position orthogonal to the third side plate 13, and is located at a position parallel to the second side plate 12. Here, the fourth side plate 14 is composed of the lower plate 14a which can move in the Y-axis direction, and the upper plate 14b which is installed at the upper portion of the lower plate 14a and can move in the X-axis direction orthogonal to the Y-axis direction, wherein the upper plate 14b of the fourth side plate 14 is in close contact with the upper plate 13b of the third side plate 13.

That is, the upper plates 11b, 12b, 13b, and 14b are sequentially brought into close contact with each other such that the size of a frame shape can be changed, and thus the width of the sealing lower clamp 100a can be changed.

Meanwhile, for the sealing performed by the sealing lower clamp 100a, a sealant is formed at an end portion of each of the upper plates 11b, 12b, 13b, and 14b, so the sealed state of a contact surface between the upper plates 11b, 12b, 13b, and 14b is maintained. In addition, a sealant is formed between each of the upper plates 11b, 12b, 13b, and 14b and the raw material such that a sealed state is maintained therebetween.

In addition, the drive means may be used as the LM guide, and all other drive means may be used.

As described above, although the vacuum forming machine having a pre-blowing lower chamber according to the embodiment of the present disclosure is illustrated according to the above description and drawings, those skilled in the art will understand that this is merely an example and that various changes and modifications can be made without departing from the spirit of the present disclosure.

What is claimed is:

1. A vacuum forming machine having a pre-blowing lower chamber and configured to vacuum form a raw material (1), the vacuum forming machine comprising:
   a sealing lower clamp (100a) configured to clamp a lower surface of an edge portion of the raw material (1);
   an upper clamp (100b) configured to clamp an upper surface of the edge portion of the raw material (1);
   a lower heater (200a) disposed at a lower side of the raw material (1) for heating the raw material (1);
   an upper heater (200b) disposed at an upper side of the raw material (1) for heating the raw material (1);
   a lower mold (300a) disposed at a at the lower side of the lower heater (200a);
   a lower chamber (400) disposed at a lower side of the raw material in which the lower heater (200a) and the lower mold (300a) are located, wherein an upper surface of the lower chamber (400) is closed by the raw material (1) and the sealing lower clamp (100a) and sealed such that air is prevented from leaking to the outside;
   a blowing device (500) configured to introduce a preset amount of air into the lower chamber (400) for limiting the raw material (1) from being thermally expanded and sagged in a heating process of the raw material (1); and
   a controller (800) configured to control an operation of the vacuum forming machine,
   wherein the sealing lower clamp (100a) comprises first, second, third, and fourth side plates (11, 12, 13, 14) to fit side surfaces of the raw material, and each of the first, second, third, and fourth side plates (11, 12, 13, 14) is configured to move in X and Y-axis directions to fit to the shape of the raw material, wherein a contact surface between the side plates and the raw material is sealed, and
   wherein the first, second, third, and fourth side plates (11, 12, 13, 14) comprise:
   lower plates (11a, 12a, 13a, 14a), respectively, that are configured to reciprocate, and
   upper plates (11b, 12b, 13b, 14b) located at upper sides of the lower plates (11a, 12a, 13a, 14a), and configured to operate in cooperation with the lower plates (11a, 12a, 13a, 14a), wherein the upper plates (11b, 12b, 13b, 14b) are configured to reciprocate in directions orthogonal to the lower plates (11a, 12a, 13a, 14a), and adjacent surfaces thereof are in close contact with each other.

2. The vacuum forming machine of claim 1, wherein as the first side plate (11) moves in the X and Y-axis directions, the second side plate (12) installed at a position orthogonal to the first side plate is configured to move in the X and Y-axis directions such that the second side plate is in close contact with a side surface of the first side plate, the third side plate (13) installed at a position orthogonal to the second side plate and is configured to move in the X and Y-axis directions such that the third side plate is in close contact with a side surface of the second side plate, and the fourth side plate (14) installed at a position orthogonal to the third side plate and is configured to move in the X and Y-axis directions such that the fourth side plate is in close contact with a side surface of the third side plate.

3. The vacuum forming machine of claim 1, wherein a sealant is placed at an end portion of each of the upper plates (11b, 12b, 13b, 14b), so a contact surface between each of the upper plates (11b, 12b, 13b, 14b) is sealed, and another sealant is placed between each of the upper plates (11*b*, 12*b*, 13*b*, 14*b*) and the raw material such that a sealed state is maintained therebetween.

\* \* \* \* \*